WILLIAM W. BALLARD.

Improvement in Wood Pavement.

No. 4,822. Reissued March 26, 1872.

*Witnesses:*

T. C. Brecht.

John Tyler

W. W. Ballard *Inventor:*

By atty Wm. Cruikshank

A.M. PHOTO-LITHOGRAPHIC CO. N.Y. (OSBORNE'S PROCESS.)

UNITED STATES PATENT OFFICE.

WILLIAM W. BALLARD, OF ELMIRA, NEW YORK, ASSIGNOR OF PART INTEREST TO TALLMADGE E. BROWN AND EDWARD L. MARSH.

IMPROVEMENT IN WOOD PAVEMENTS.

Specification forming part of Letters Patent No. 105,292, dated July 12, 1870; reissue No. 4,822, dated March 26, 1872.

Be it known that I, WM. W. BALLARD, of Elmira, in the county of Chemung and State of New York, have made certain new and useful Improvements in Wood Pavements, of which the following is a description:

My invention has for its object the production of wooden paving-block, of a truncated wedge shape, and adapted to interlock with the adjacent blocks when laid in a pavement; and consists in forming within one side of the block a seemingly projecting, and within the other a depressed locking, face or angle, the said faces being formed within the planes of the two sides, and thus avoiding any material waste of lumber in cutting the blocks; and my invention further consists in taking off a slight portion of one corner of the block at its base in a line about parallel with the opposite bevel side of the block, thus forming an obtuse angle on this side, and cutting into the opposite side, in line with the projecting angle thus formed, a depressed angle or cavity, which shall be adapted to receive and coincide with the obtuse projecting angle referred to, as will be hereinafter more fully set forth.

To enable those skilled to fully understand my invention, I will proceed to describe the same, referring by letters to the accompanying drawing, in which—

Figure 1:
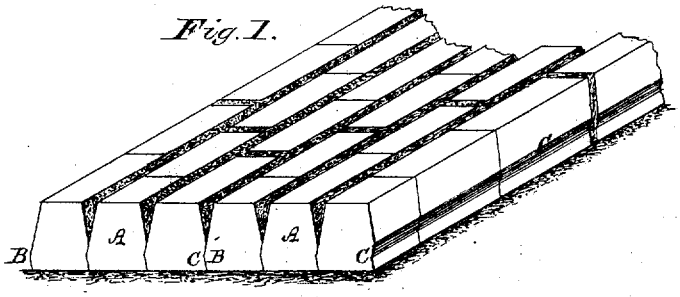
Figure 2:
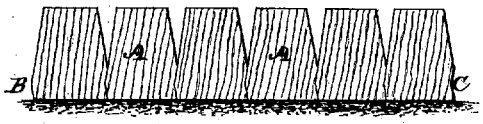
Figure 3:
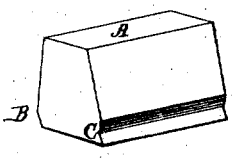
Figure 4:
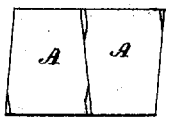
Figure 5:
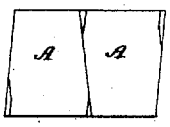

Figure 1 is a perspective view of a section of pavement laid with my improved block, and clearly showing the locking principle. Fig. 2 is an end elevation; Fig. 3, a detail view of one of the blocks. Figs. 4 and 5 are detail views of the blocks in pairs as they leave the splitting-machine, and showing the manner in which the angles are formed with slight waste of material.

Similar letters indicate like parts in the several figures.

A represents the ordinary truncated wedge-shaped block, having one of its acute angles or base-corners cut away in a line about parallel with the other beveled side of the block, thus forming an obtuse angle, B. The opposite base-corner is cut away, as seen, so as to form a depressed angle or cavity, C, which will receive and coincide with the obtuse angle B of the next adjacent block when laid to form a pavement; and it will be observed these locking-faces are contained within the planes of the sides of the original truncated wedge, or, in other words, do not project beyond the side plane drawn from top to bottom of block, and therefore there is no waste of material above or below the locking-joint, as would necessarily occur did the joint project beyond the planes bounding the sides.

In a pavement made of blocks embodying this locking principle, broadly or specially, as shown, the rows of blocks when laid are simply placed in perfect contact, and thereby key or lock one another against any possible vertical displacement.

The curb-blocks may be formed without any keying-angles, to enable the others to be removed, and other like blocks may be placed at such points as may be deemed convenient or necessary, though I prefer to use only the curb-blocks. These interlocking blocks are specially and more particularly adapted to the construction of pavements where no board foundation is used, though, of course, they may be advantageously employed for pavements having any kind of foundation.

In pavements to which this kind of block is specially adapted, the great disadvantage that exists is the liability of one or more of the blocks settling or becoming forced down below the face of the street, thus leaving depressions, rendering it uneven, and forming receptacles for the accumulation of decaying matter, and facilitating the more rapid destruction of the street.

This difficulty is completely and perfectly overcome by my invention, as every block is keyed firmly (by laying them to break joints) in lines parallel and at right angles to the curb, so that any pressure that might happen to rest or be exerted upon one individual block is transmitted to and divided among those next adjacent, or, in other words, a pavement is formed having one solid "intact" base, and yet capable of being repaired or taken up block by block, and presenting a surface resting, as it were, upon a perfect arch. The wedge-shaped spaces which are of necessity produced by the contact of the block are filled in the usual manner with concrete and rammed.

It has always been desirable to do away with the expensive wood flooring or foundation, for the reason that, aside from the expense, it is the first part of the pavement attacked by decay; if not put down with the utmost skill it will vibrate and loosen the whole structure, and is an impediment to the ready removal of any given portion of the pavement. Builders have been unable to discard it for the reason heretofore stated—viz., that the blocks would settle down one below another, unless they were keyed.

The only keying devices known prior to my invention have been of an independent or separate nature, and for obvious reasons impractical, and have therefore been more or less discarded. The method by which my blocks are cut forms no part of my present invention, as they may be cut by substantially the same mode as that covered by prior Letters Patent to me, or in any other manner having economy in view which may naturally suggest itself. I have, however, shown two ways at Figs. 4 and 5 of the drawing, in which the cuts are made to form the locks by rotary cutters set in advance of the splitting-saws. The loss in lumber is virtually of no importance in quantity, and less in value as the wedge-shaped space and concrete is proportionally lessened.

Having described the object and advantages of my invention, what I claim as new, and desire to secure by Letters Patent, is—

1. Broadly, a wood pavement composed of truncated wedge-shaped blocks adapted to interlock and support each other, when the locking and supporting faces lie within the extended plane of the inclined sides of the block.

2. I also claim a block for wood pavement of a truncated wedge-shape contour, provided with locking faces or angles, substantially such as shown and described.

Witness my hand and seal this 5th day of February, 1872.

WM. W. BALLARD. [L. S.]

Witnesses:
WM. C. MCINTIRE,
CHAS. E. UPPERMAN.